(12) United States Patent
Reddivari et al.

(10) Patent No.: US 11,790,573 B2
(45) Date of Patent: Oct. 17, 2023

(54) SYSTEMS AND METHODS FOR USING AUGMENTED REALITY FOR ANTENNA ADJUSTMENT

(71) Applicant: Sling Media Pvt. Ltd., Bengaluru Karnataka (IN)

(72) Inventors: Girish Reddivari, Bangalore (IN); Prashanth Reddy Tummalapalli, Nalgonda district (IN); Gopikumar Ranganathan, Bangalore (IN)

(73) Assignee: DISH NETWORK TECHNOLOGIES INDIA PRIVATE LIMITED, Bengalore (IN)

( * ) Notice: Subject to any disclaimer, the term of this patent is extended or adjusted under 35 U.S.C. 154(b) by 0 days.

(21) Appl. No.: 17/562,909

(22) Filed: Dec. 27, 2021

(65) Prior Publication Data

US 2023/0206514 A1    Jun. 29, 2023

(51) Int. Cl.
| | | |
|---|---|---|
| *G06T 11/00* | (2006.01) | |
| *G06T 7/70* | (2017.01) | |
| *G06V 20/20* | (2022.01) | |
| *H04N 7/18* | (2006.01) | |
| *H04W 64/00* | (2009.01) | |
| *G06V 10/94* | (2022.01) | |

(52) U.S. Cl.
CPC ............. *G06T 11/00* (2013.01); *G06T 7/70* (2017.01); *G06V 10/945* (2022.01); *G06V 20/20* (2022.01); *H04N 7/183* (2013.01); *H04W 64/003* (2013.01); *G06T 2200/24* (2013.01)

(58) Field of Classification Search
CPC ............ G06T 11/00; G06T 7/70; G06V 20/20
See application file for complete search history.

(56) References Cited

U.S. PATENT DOCUMENTS

| | | |
|---|---|---|
| 7,295,882 B2 | 11/2007 | Champion et al. |
| 8,606,657 B2 | 12/2013 | Chesnut et al. |
| 9,235,824 B2 | 1/2016 | Martin et al. |
| 9,336,541 B2 | 5/2016 | Pugazhendhi et al. |
| 9,355,452 B2 | 5/2016 | Sugden |
| 10,049,276 B1 | 8/2018 | Harper et al. |
| 2014/0146239 A1* | 5/2014 | Guillen ............ H04N 21/25841 348/731 |
| 2020/0288284 A1* | 9/2020 | Klein ....................... H04W 4/70 |
| 2022/0130145 A1* | 4/2022 | Connary ................. G06V 20/10 |

FOREIGN PATENT DOCUMENTS

EP    2942693 A1    11/2015

* cited by examiner

*Primary Examiner* — Samantha (Yuehan) Wang
(74) *Attorney, Agent, or Firm* — SEED IP LAW GROUP, LLP (57) ABSTRACT

An antenna position determination system determines a position for an antenna to communicate with a broadcast tower and present the antenna to a user via augmented reality. The antenna position determination system receives information indicating one or more broadcast towers including a location for each broadcast tower. The antenna position determination system selects a broadcast tower of the one or more broadcast towers and receives an image of an antenna. The antenna position determination system determines a position for the antenna to communicate with the selected broadcast tower based on the image of the antenna and the selected broadcast tower. The antenna position determination system presents the determined position of the antenna to a user via an augmented reality user interface.

18 Claims, 10 Drawing Sheets

SYSTEMS AND METHODS FOR USING AUGMENTED REALITY FOR ANTENNA ADJUSTMENT

BRIEF SUMMARY

Over the Air Antennas ("OTA Antennas") communicate with broadcast towers to provide a consumer access to media, such as through television, radio, etc., the internet, or other wireless communication or services. However, OTA Antennas must be aligned with the broadcast tower in order to communicate with the tower. Furthermore the alignment of the antenna affects the signal strength of the antenna's communication for a tower, such that an antenna which is out of alignment receives a weaker signal than an antenna which is in alignment. An antenna's alignment and signal strength may be affected by the movement of the antenna, obstacles being placed in between the antenna and the tower, changes in the environment around the antenna, new broadcast towers becoming available, and other situations which may cause the antenna to have lower signal strength when communicating to, or come out of alignment with, the broadcast tower.

Furthermore, in order to improve the signal strength and bring the antenna back into alignment, a user must move the antenna into alignment with the broadcast tower. However, a user may not know where broadcast towers are located, what obstacles may be in between the antenna and the broadcast tower, and the correct angle that the antenna should be at in order to improve the antenna's communication with the broadcast tower. Additionally, even if the user is able to move the antenna to a position which improves the antenna's communication with the broadcast tower, the user is unable to know whether that position is the optimal position for the antenna's communication with the broadcast tower.

The embodiments disclosed herein address the issues above and thus help solve the above technical problems and improve the technology of OTA Antennas by providing a technical solution that determines a position for an antenna to communicate with a broadcast tower and indicates the position to the user via augmented reality. Additionally, the embodiments disclosed herein are able to assist a user in selecting a broadcast tower for the antenna by assisting the user in identifying any obstacles between the broadcast tower and the antenna which may affect the antenna's communication with the broadcast tower. Furthermore, the embodiments described herein are able to determine whether the user has placed the antenna in the correct position after the user has selected the broadcast tower and adjusted the antenna.

In some embodiments, an antenna position determination system receives information indicating broadcast towers, including a location for each tower, selects a broadcast tower, receives an image of an antenna, determines based on the image of the antenna and the selected broadcast tower a position for the antenna, and presents, via an augmented reality user interface, the position for the antenna to a user. In some embodiments, antenna position determination system presents the location of the broadcast towers to the user via the augmented reality user interface, such that the user can select one of the broadcast towers. In some embodiments, the antenna position determination system receives a live video feed of the antenna and determines whether the antenna is in the determined position.

DETAILED DESCRIPTION

Network providers, such as cellular network providers, radio network providers, television network providers, telecommunication network providers, etc., typically have multiple broadcast towers in an area. Users are able to receive content from the broadcast towers by using OTA antennas which are positioned to communicate with one of the broadcast towers. However, over time the antennas may fall out of alignment with the broadcast tower, obstacles may appear between the antenna and the broadcast tower, weather may inhibit the antenna's signal, or other situations may occur which affect the strength of the signal used by the antenna to communicate with the broadcast tower. These situations may prevent the user from receiving certain channels, such as a television or radio channels, may cause the user to receive poor signal quality, etc.

Currently, it is difficult for users to determine how to position an OTA antenna when the signal strength between the antenna and the broadcast tower is weakened. While users are able to manually adjust their antennas, it is difficult for them to locate broadcast towers, determine an optimal position for the antenna, and re-align the antenna so that it is in the optimal position. Thus, the users must either accept a weaker signal or try to improve the signal strength through trial and error. Furthermore, because a network provider may have many broadcast towers, it may be difficult for the user to select the best broadcast tower without a large amount of user effort in determining which broadcast tower would be the best tower for their antenna.

The embodiments disclosed herein help solve the above technical problems and improve the technology of OTA antennas by providing a technical solution that determines a position for an antenna and displays the new position to a user via augmented reality. In some embodiments, the antenna position determination system provides an interface which allows a user to select a broadcast tower. In some embodiments, the antenna position determination system uses a live video feed of the antenna to determine whether the antenna is in the determined position.

In some embodiments, the antenna position determination system presents an augmented reality user interface to a user. The augmented reality user interface may include a depiction of the antenna in the determined position. The augmented reality user interface may indicate the location of one or more broadcast towers to the user. The antenna position determination system may receive information describing the broadcast towers, such as the location of the broadcast towers, from the network provider. The antenna position determination system may receive a selection of a broadcast tower via the augmented reality user interface.

In some embodiments, the antenna position determination system includes a camera. The antenna position determination system may use the camera to capture visual data, such as images or video: of the antenna, of the environment around the antenna, for presenting the augmented reality user interface to the user, etc.

In some embodiments, the antenna position determination system performs object recognition on the captured visual data. The antenna position determination system may use object recognition to identify the antenna, obstacles between the antenna and broadcast towers, or other objects which may be of use to the antenna position determination system. The antenna position determination system may identify obstacles between the location of the antenna and the location of a selected tower. The antenna position determination system may indicate the obstacles to the user via the augmented reality user interface, such as by changing the color of the obstacle, adding a light effect around the obstacle (e.g. a glow or halo effect), via text or symbols which draw the user's attention to the obstacle (e.g. an arrow, text indicating the location of the obstacle, etc.), or other methods of indicating an object of importance to a user.

In some embodiments, the antenna position determination system identifies obstacles between the antenna and multiple broadcast towers. The antenna position determination system may determine which broadcast tower has the fewest obstacles between the antenna and the broadcast tower based on the identified obstacles. The antenna position determination system may indicate the broadcast tower with the fewest obstacles between the antenna and the broadcast tower to the user. In such embodiments, the antenna position determination system may identify obstacles between the user and each of the broadcast towers, determine whether there are fewer obstacles between the antenna and a broadcast tower other than the selected broadcast tower, and indicate the broadcast tower with fewer obstacles between it and the antenna to the user.

In some embodiments, the antenna position determination system presents a live video feed of the antenna to the user via the augmented reality user interface. The antenna position determination system may identify the antenna in the live video feed by using object recognition. The antenna position determination system may determine whether the antenna is in the determined position by using object recognition techniques to identify a position, tilt, location, etc. of the antenna. The antenna position determination system may indicate whether the antenna is in the determined position to the user via the augmented reality user interface.

In some embodiments, the antenna position determination system indicates the determined position of the antenna on the live video feed by using augmented reality. The antenna position determination system may indicate the determined position of the antenna by including a virtual antenna in the determined position in the augmented reality user interface. The antenna position determination system may change an attribute of the virtual antenna based on a determination of whether the antenna is in the determined position, such as changing the color of the virtual antenna, adding a visual effect to the virtual antenna, displaying text near the virtual antenna, etc.

In some embodiments, the antenna position determination system identifies the antenna in an image by using object recognition techniques. The antenna position determination system may identify an attribute of the antenna by using the object recognition techniques on the image. The antenna position determination system may receive data regarding an attribute of the antenna via user input. The attributes of the antenna may include one or more of: the tilt of the antenna, position of the antenna, orientation of the antenna, type of antenna, the distance of the antenna from the ground, or other attributes of an OTA antenna. The antenna position determination system may determine the new position for the antenna based on one or more of: the image of the antenna, the selected tower, and one or more of the identified attributes of the antenna, such as the tilt of the antenna. The antenna determination system may receive a second image of the antenna and may use object recognition techniques to identify one or more attributes of the antenna. The identified attributes of the antenna may be used to determine whether the antenna is in the new position.

In some embodiments, the antenna position determination system detects a signal strength for the antenna's communication with a broadcast tower. The antenna determination system may detect the signal strength by communicating with the broadcast tower, the network provider's systems, etc., to obtain information describing the antenna's communication with the broadcast tower, such as a signal strength for the antenna's communication with the broadcast tower. The antenna determination system may obtain identifying information from the antenna, such as via user input, near field communication, wired or wireless communication techniques, scanning a machine-readable code, etc. The identifying information may be used by the antenna position determination system to query the broadcast tower, network provider, etc., to obtain the information describing the antenna's communication with the broadcast tower.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
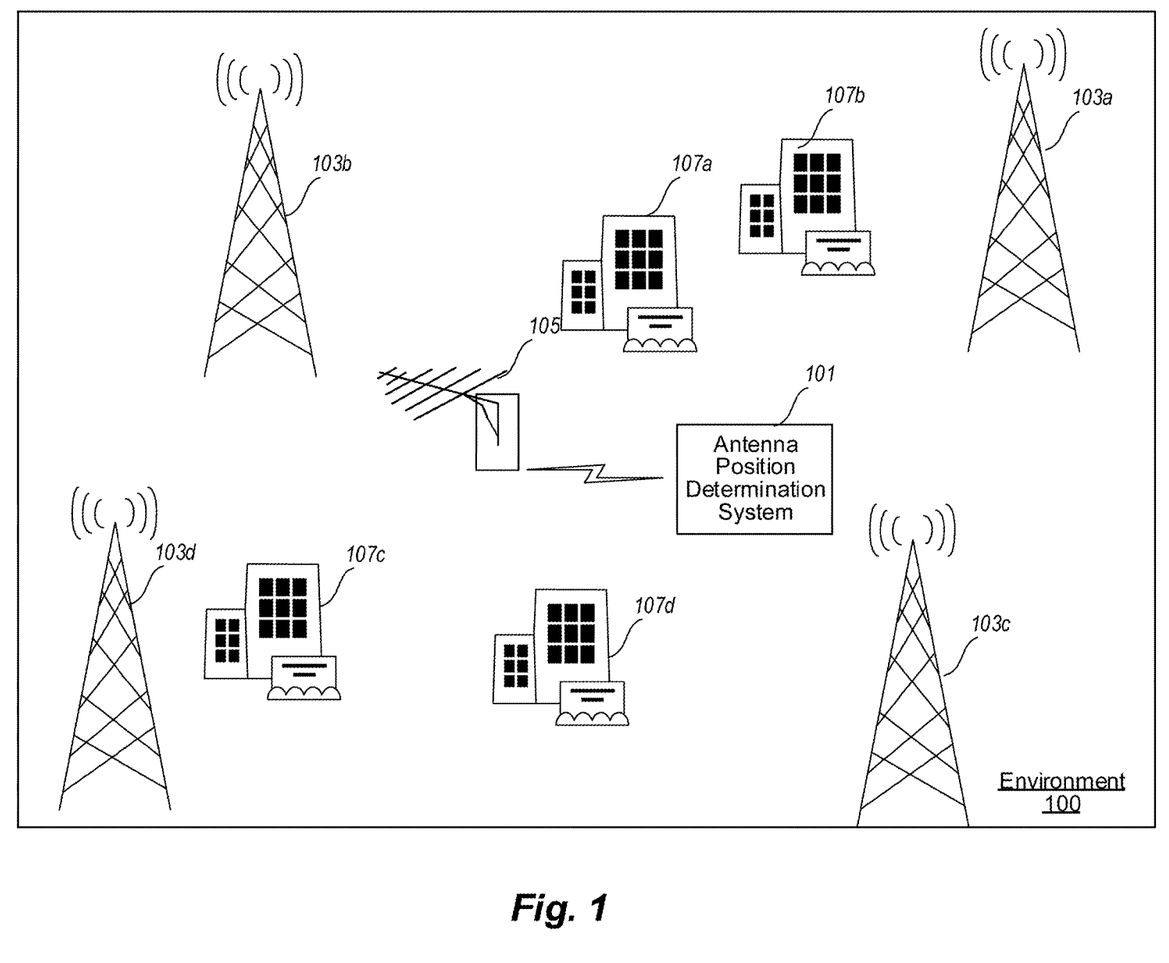
FIG. 1 is a diagram depicting an example environment in which an antenna position determination system is implemented.

FIG. 1 is a diagram depicting an example environment in which an antenna position determination system is implemented. It is to be appreciated that FIG. 1 illustrates just one example of an environment 100 and that the various embodiments discussed herein are not limited to the use of such an environment. The environment 100 includes an antenna position determination system 101, broad cast towers 103a-103d, an antenna 105, and obstacles 107a-107d. The antenna position determination system 101 may communicate with the antenna 105, a broadcast tower 103a-103d, or a network provider (not shown).

The environment 100 may include a network, communication system, or networked system (not shown), to which the antenna position determination system 101, broadcast towers 103a-103d, and antenna 105 may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more endpoint devices, such as PCs, tablets, laptop computers, smartphones, personal assistants, Internet connection devices, wireless LAN, WiFi, Worldwide Interoperability for Microwave Access (WiMax) devices, or the like, may be communicatively coupled to the network and/or to each other so that the plurality of endpoint devices are communicatively coupled together. Thus, such a network enables the antenna position determination system 101, broadcast towers 103a-103d, and antenna 105, present in the environment 100, to communicate with each other.

The antenna position determination system 101 identifies an antenna 105 and determines an optimal position, such as an orientation, tilt, etc., for the antenna to communicate with a selected broadcast tower. The antenna position determination system 101 is also able to display an augmented reality user interface which indicates the optimal position of the antenna to a user.

The antenna position determination system 101, or portions of the antenna position determination system 101, may be included in a devices such as cellular telephones, smartphones, tablets, personal computers, laptop computers, wireless peripheral devices such as headphones, microphones, mice, keyboards, etc., Internet of Things (or "smart") devices, televisions, smart televisions, smart television devices—such as FireTV, Roku, AppleTV, etc.,—personal assistant devices—such as Amazon Alexa, Google Home, etc.,—digital assistants, etc. The antenna position determination system 101 may interconnect to one or more communications media or sources, such as routers, network switches, modems, etc., to transmit communications to other devices.

The broadcast towers 103a-103d are broadcast towers (collectively "broadcast towers 103") controlled or owned by a network provider. The broadcast towers 103 communicate with an antenna to broadcast content to the antenna.

The antenna 105 is an antenna, such as an OTA antenna, which is used to communicate with and receive content from a broadcast tower, such as one of the broadcast towers 103. The antenna 105 transmits the received content to a user device, such that the user is able to consume the received content.

The obstacles 107a-107d are obstacles which may block, interfere with, or otherwise impede a signal transmitted between the broadcast towers 103 and the antenna 105. The obstacles 107a-107d may be buildings, trees, weather events, hills, mountains, or other things which may impede a signal transmitted between a broadcast tower and an antenna.

The above description of the environment 100, and the various devices and functions therein, is intended as a broad, non-limiting overview of an example environment in which various embodiments of an antenna position determination system can operate. The environment 100, and the various devices therein, may contain other devices, systems and/or media not specifically described herein. The environment 100, and the various functions therein, may contain other functions, systems and/or media not specifically described herein.

Example embodiments described herein provide applications, tools, data structures and other support to implement systems and methods for determining an antenna position for an antenna to communicate with a broadcast tower. The example embodiments described herein additionally provide applications, tools, data structures and other support to implement systems and methods for displaying an optimized position of the antenna to a user via augmented reality. Other embodiments of the described techniques may be used for other purposes, including for determining the signal strength for an antenna's communication with the broadcast tower. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
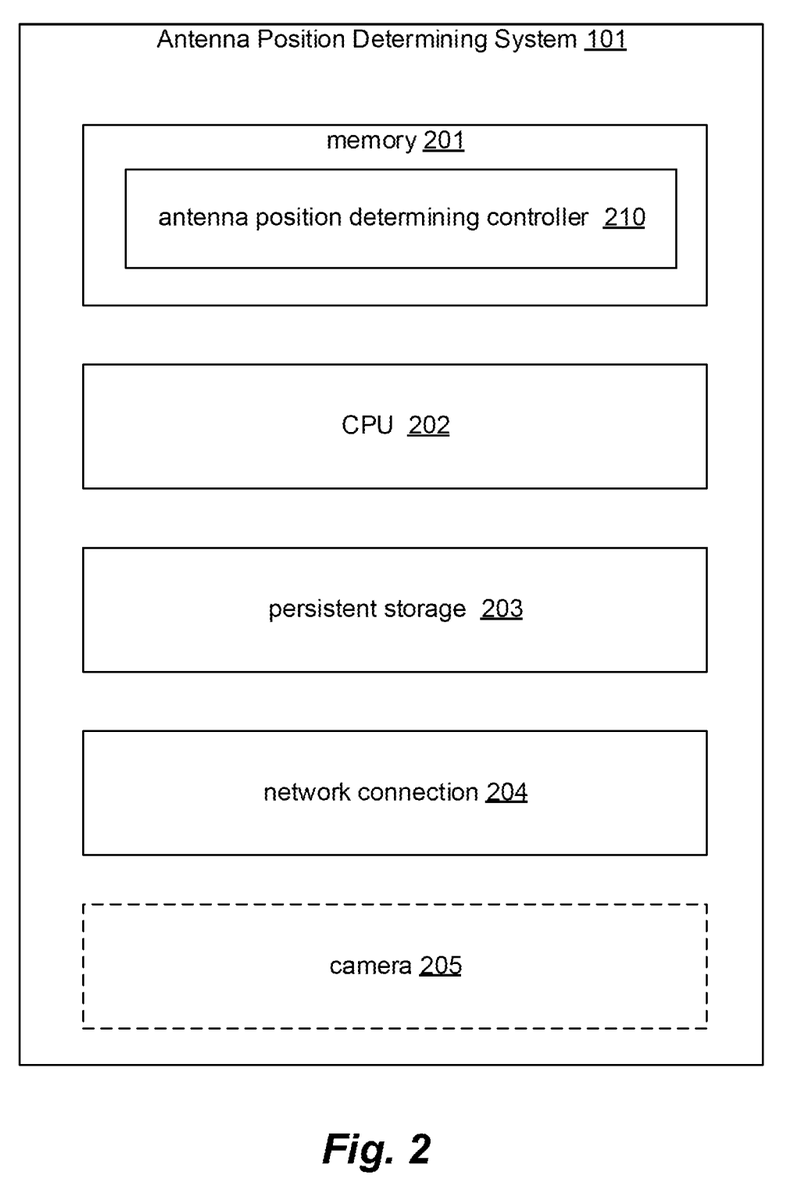
FIG. 2 is a block diagram depicting example components incorporated in an antenna position determination system, according to various embodiments described herein.

FIG. 2 is a block diagram depicting example components incorporated in an antenna position determination system 101, according to various embodiments described herein. In various embodiments, the antenna position determination system 101 includes one or more of the following: a computer memory 201 for storing programs and data while they are being used, including data associated with the broadcast towers 103, antenna 105, obstacles 107 and the antenna position determination system 101, an operating system including a kernel, and device drivers; a central processing unit (CPU) 202 for executing computer programs; a persistent storage device 203, such as a hard drive or flash drive for persistently storing programs and data; and a network connection 204 for connecting to one or more computer devices, antenna 105, broadcast towers 103, the network provider's systems (not shown) and/or other computer systems, to send and/or receive data, such as via the Internet or another network and associated networking hardware, such as switches, routers, repeaters, electrical cables and optical fibers, light emitters and receivers, radio transmitters and receivers, and the like. In some embodiments, the antenna position determination system additionally includes, or communicates with, a camera 205 to obtain visual data, such as images, video, live video, etc. In various embodiments, the antenna position determination system 101 additionally includes input and output devices, such as a keyboard, a mouse, display devices, etc.

While an antenna position determination system 101 configured as described may be used in some embodiments, in various other embodiments, the antenna position determination system 101 may be implemented using devices of various types and configurations, and having various components. The memory 201 may include an antenna position determining controller 210 which contains computer-executable instructions that, when executed by the CPU 202, cause the antenna position determination system 101 to perform the operations and functions described herein. For example, the programs referenced above, which may be stored in computer memory 201, may include or be comprised of such computer-executable instructions. The memory 201 may also include data describing the broadcasting towers 103.

The antenna position determining controller 210 performs the core functions of the antenna position determination system 101, as discussed herein and also with respect to FIGS. 3a through 11. In particular, the antenna position determining controller 210 changes determines a position for an antenna to communicate with a broadcast tower and displays that position to a user via an augmented reality user interface. Additionally, the antenna position determining controller 210 may indicate to the user whether the antenna is in the determined position. The antenna position determining controller 210 may also identify obstacles between the antenna and a broadcast tower.

In an example embodiment, the antenna position determining controller 210 and/or computer-executable instructions stored on memory 201 of the antenna position determination system 101 are implemented using standard programming techniques. For example, the antenna position determining controller 210 and/or computer-executable instructions stored on memory 201 of the antenna position determination system 101 may be implemented as a "native" executable running on CPU 202, along with one or more static or dynamic libraries. In other embodiments, the antenna position determining controller 210 and/or computer-executable instructions stored on memory 201 of the antenna position determination system 101 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the antenna position determination system 101.

In addition, programming interfaces to the data stored as part of the antenna position determining controller 210 can be available by standard mechanisms such as through C, C++, C#, Java, and Web APIs; libraries for accessing files, databases, or other data repositories; through scripting languages such as JavaScript and VBScript; or through Web servers, FTP servers, or other types of servers providing access to stored data. The antenna position determining controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of antenna position determining system 101, broadcast towers 103a-103d, and/or antenna 105.

Furthermore, in some embodiments, some or all of the components/portions of the antenna position determining controller 210, and/or functionality provided by the computer-executable instructions stored on memory 201 of the antenna position determination system 101 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

Figure 3A:
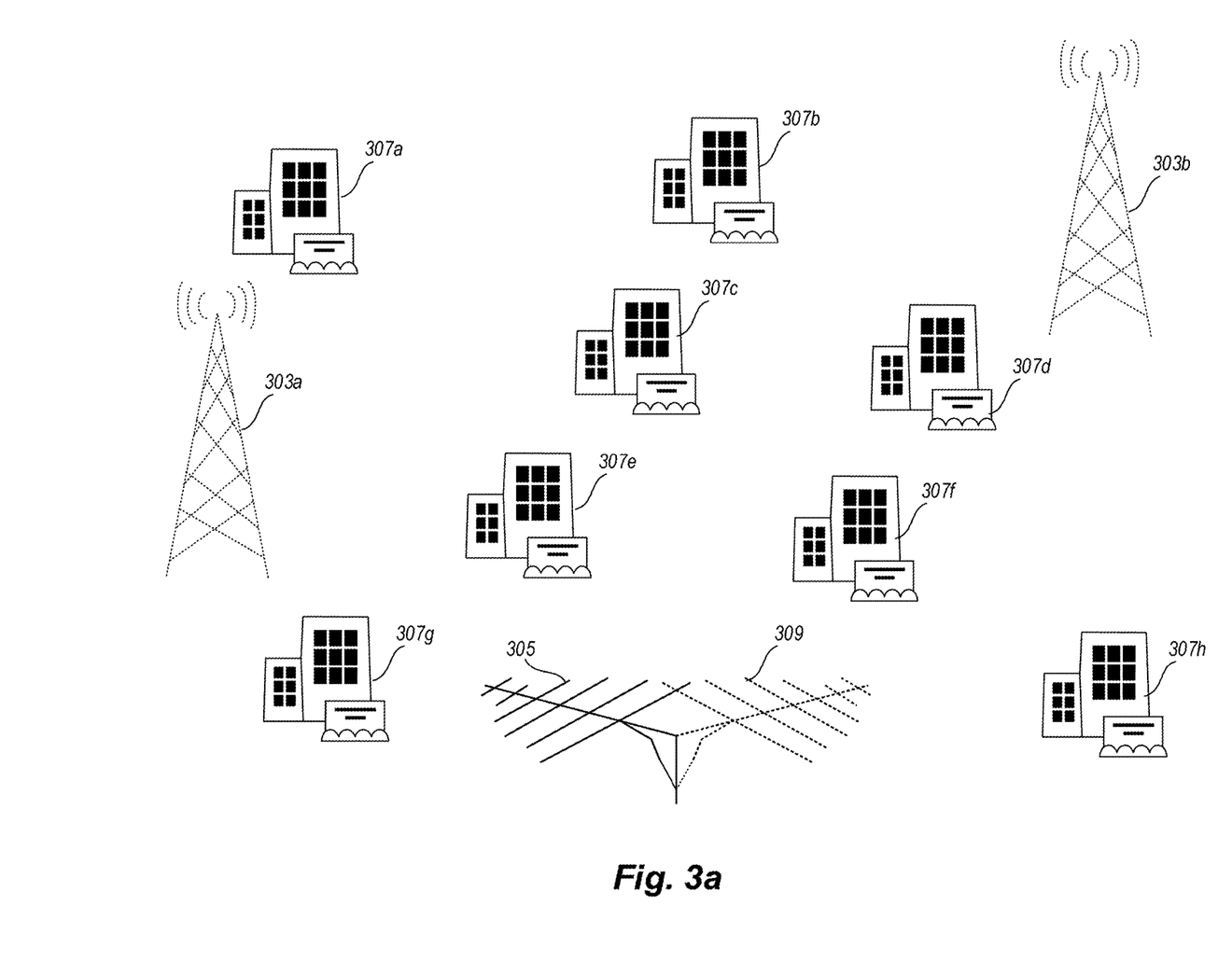
FIG. 3a is a display diagram depicting the real-world and virtual objects which may be displayed by the antenna position determination system, according to various embodiments described herein.

FIG. 3a is a display diagram depicting the real-world and virtual objects which may be displayed by the antenna position determination system 101, according to various embodiments described herein. FIG. 3a includes virtual broadcast towers 303a-303b, an antenna 305, obstacles 307a-h, and a virtual antenna 309. The antenna 305 is similar to the antenna 105. The obstacles 307a-307h ("obstacles 307") are similar to the obstacles 107a-107d. The antenna 305 and obstacles 307 are real-objects which appear in image data obtained by the antenna position determination system. The antenna position determination system may identify each of the antenna 305 and obstacles 307, as well as attributes regarding the antenna 305 and obstacles 307, via object recognition techniques. Thus, an augmented reality user interface is able to display the antenna 305 and obstacles 307 as they appear in the real world.

The virtual broadcast towers 303a-303b are virtual objects which represent broadcast towers which exist in the real-world, such as the broadcast towers 103. The virtual broadcast towers 303a-303b are included in the augmented reality user interface relative to their real-world location. The virtual antenna 309 is a virtual object which represents a new position of the antenna 305.

Figure 3B:
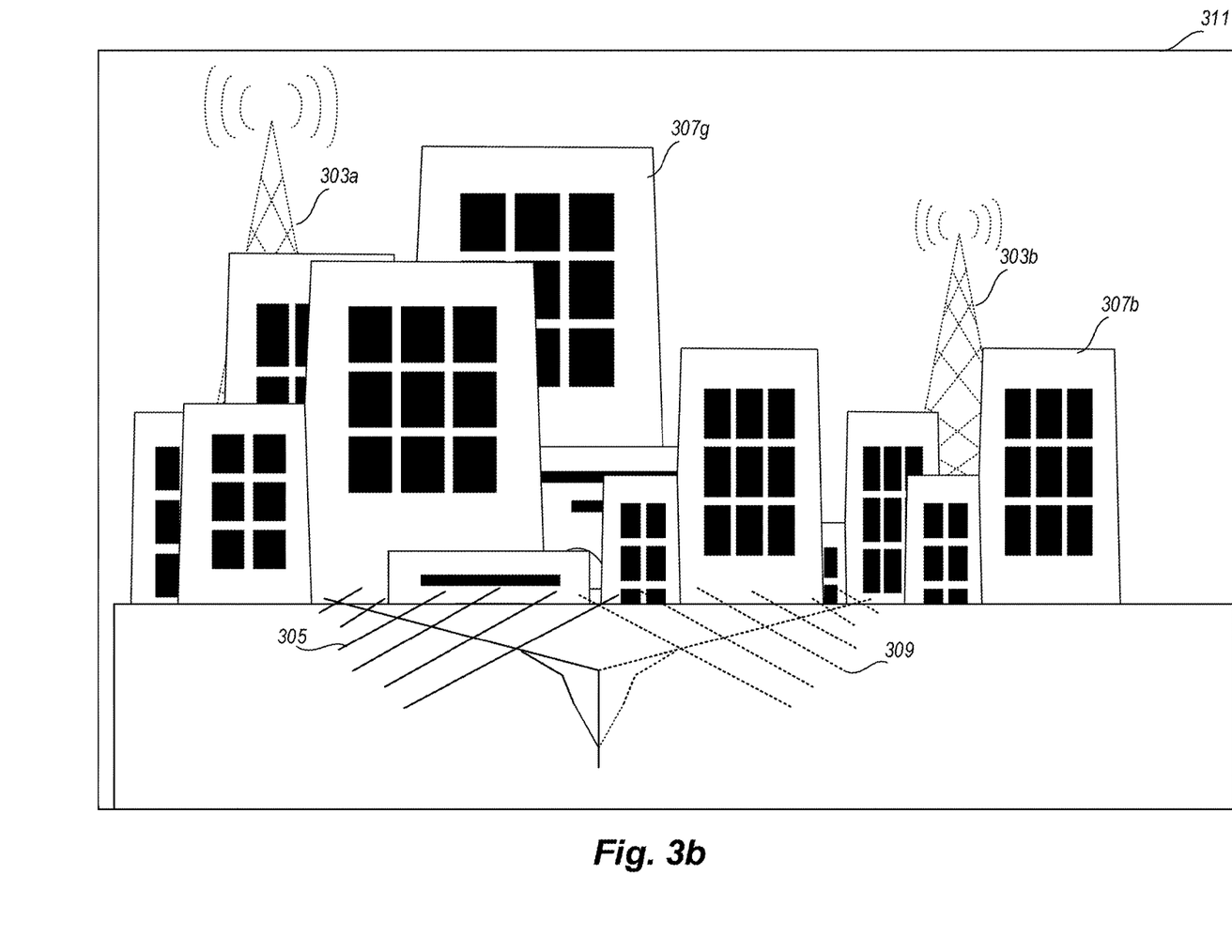
FIG. 3b is a display diagram depicting an augmented-reality user interface which may be displayed by the antenna position determination system, according to various embodiments described herein.

FIG. 3b is a display diagram depicting an augmented-reality user interface 311 which may be displayed by the antenna position determination system, according to various embodiments described herein. The augmented-reality user interface 311 may include the virtual broadcast towers 303a-303b, the antenna 305, the obstacles 307a-307h, and the virtual antenna 309. In the augmented-reality user interface, the virtual objects, such as the virtual broadcast towers 303a-303b and virtual antenna 309, may be displayed such that they appear in their real-world location.

For example, broadcast tower 303a is larger than broadcast tower 303b, indicating that broadcast tower 303a is closer to the user than broadcast tower 303b. Additionally, in this example, the virtual antenna 309 is pointing towards broadcast tower 303b, indicating that broadcast tower 303b was selected by the user. This also indicate that the user 305 should move the antenna 305 to match the virtual antenna 309, such that when the antenna 305 and virtual antenna 309 are aligned, the antenna 305 will be able to communicate more effectively with broadcast tower 303b.

Furthermore, because the augmented-reality user interface utilizes augmented reality, the virtual broadcast towers 303a-303b and virtual antenna 305 stay in the same virtual location when the user moves to a different position or location. For example, if the user were to turn 180 degrees, the virtual broadcast towers 303a-303b and antenna 309 would not be visible to the user in the augmented-reality user interface. Likewise, if the user moved in front of the antenna 305 and turned to face the antenna 305, the virtual antenna 309 would be visible to the user, but the broadcast towers 303a-303b would not be visible to the user. Thus, the virtual objects presented by the augmented-reality user interface may be tethered to a real-world location, such that the user is able to see the virtual objects if they are able to see the location.

In some embodiments, although not shown in FIG. 3b, the augmented-reality user interface is able to place a virtual object in front of obstacles if the virtual object is behind too many obstacles to see. For example, if another broadcast tower was completely obscured by obstacle 307g, the antenna position determination system may place the virtual broadcast tower on the augmented-reality user interface such that it is "in front of" the obstacle 307g. In such an embodiment the antenna position determination system may alter the size of a virtual object, such as the virtual broadcast tower, to indicate its distance to the user, such as by making the object appear smaller the farther away it is from the user, larger the closer it is to the user, etc.

In addition to depicting the real-world and virtual objects, the antenna position determination system is able to include indicators to objects, change the color of objects, include text, or include other features which indicate information to a user. For example, the virtual antenna 309 may change color based on how close the antenna 305 is to the position indicated by the virtual antenna 309, certain obstacles may be highlighted or brought to the attention of a user, a broadcast tower may be highlighted or brought to the attention of a user, a signal strength of a broadcast tower may appear above the broadcast tower, etc.

The augmented-reality user interface may also be able to receive user input. The user input may include selecting a broadcast tower or other virtual object, selecting a real-world object, receiving information regarding a virtual object or real-world object, requesting information for a virtual object or real-world object, etc.

Figure 4:
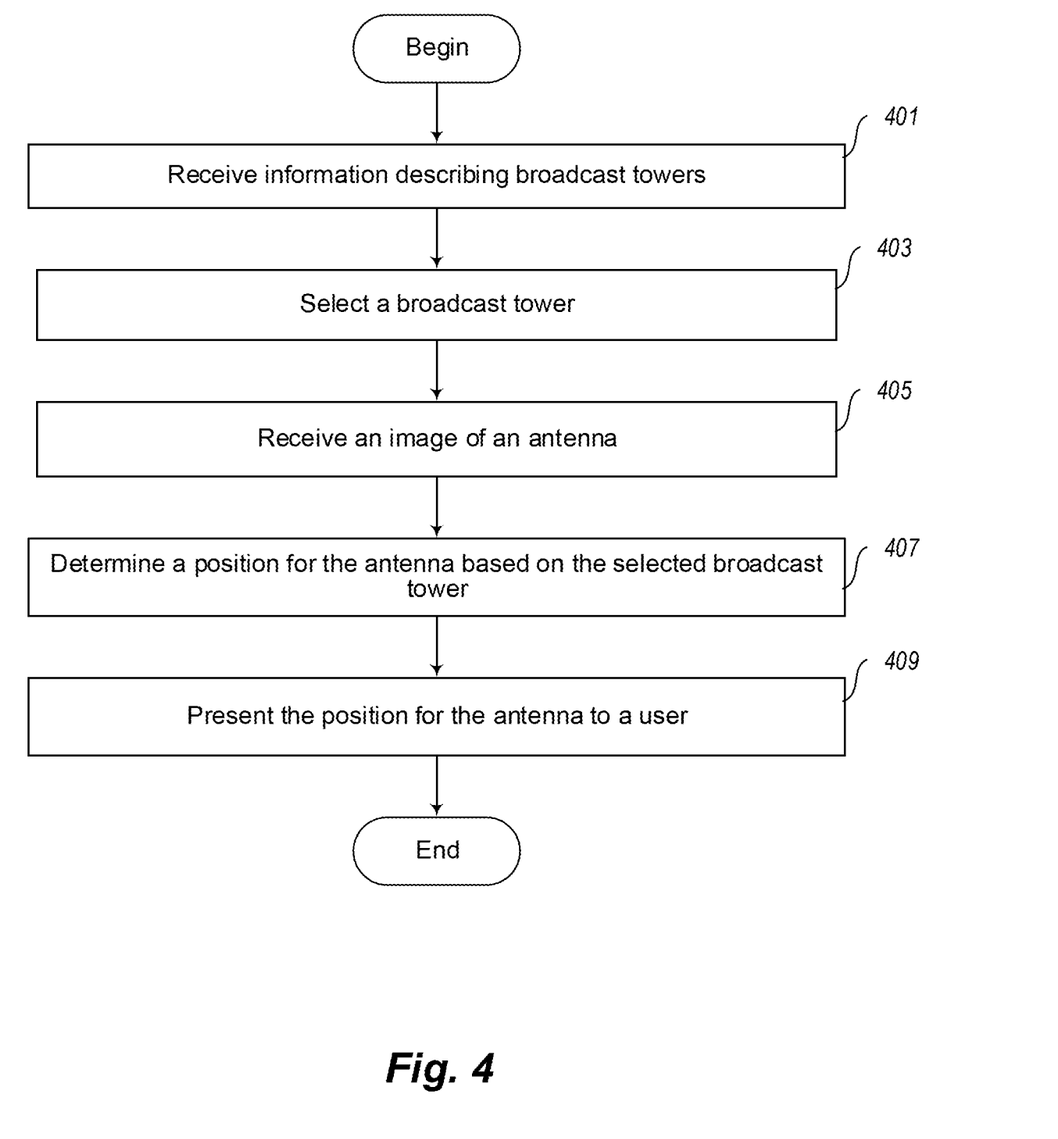
FIG. 4 is a flow diagram depicting a process to present a new antenna position to a user, according to various embodiments described herein.

FIG. 4 is a flow diagram depicting a process to present a new antenna position to a user, according to various embodiments described herein. At act 401, the antenna position determination system receives information describing one or more broadcast towers. In some embodiments, the information describing one or more broadcast towers is received from a network provider. In some embodiments, the antenna position determination system indicates the information describing the broadcast towers to a user, such as by using an augmented reality user interface.

At act 403, the antenna position determination system selects a broadcast tower. In some embodiments, the antenna position determination system receives user input selecting a broadcast tower. In some embodiments, the antenna position determination system determines which broadcast tower should be selected based on one or more of: the distance between the broadcast tower and the antenna; the environment or topology of the area between the broadcast tower and the antenna; one or more attributes of the antenna; obstacles between the broadcast tower and the antenna; a signal strength of the antenna's signals to the broadcast tower; or other factors which may be used to select a broadcast tower for an antenna. The antenna position determination system may suggest a broadcast tower to the user based on the determination of which broadcast tower should be selected.

At act 405, the antenna position determination system receives an image of an antenna. The antenna position determination system may perform object recognition on the image of the antenna to determine one or more attributes of the antenna. The image of the antenna may be captured by a camera included in the antenna position determination system. The image of the antenna may be obtained from a video of the antenna. The video may be a live video. The antenna position determination system may receive user input describing one or more attributes of the antenna.

At act 407, the antenna position determination system determines a position for the antenna based on the selected broadcast tower. The antenna position determination system may use one or more of: the image of the antenna and one or more attributes of the antenna to determine the position of the antenna for the selected broadcast tower. In some embodiments, the antenna position determination system calculates a position for the antenna such that the antenna is facing parallel to the broadcast tower.

At act 409, the antenna position determination system presents the determined position to the user. The antenna position determination system may present the determined position by using an augmented-reality user interface.

After act 409, the process ends.

Figure 5:
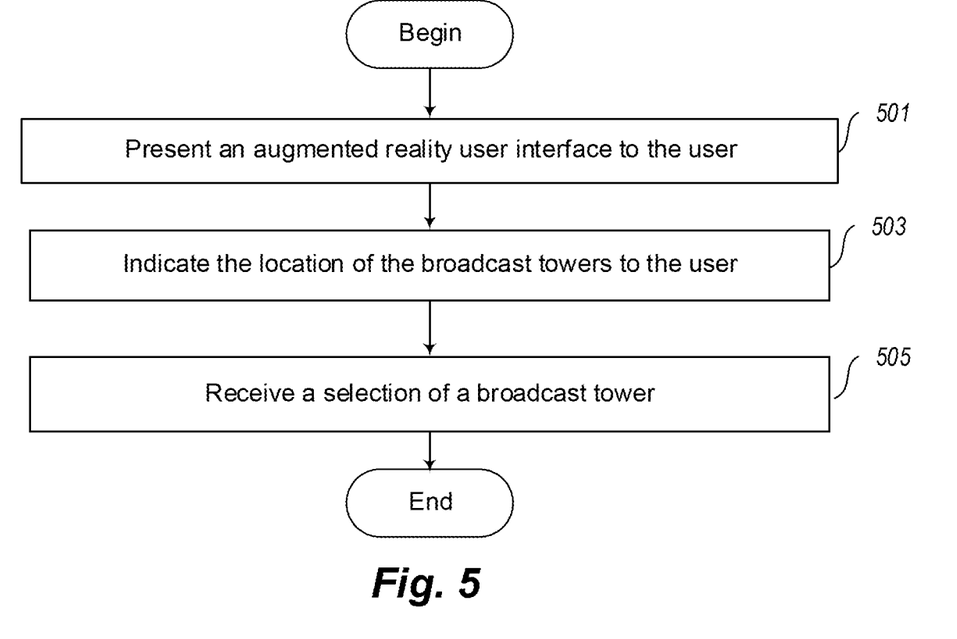
FIG. 5 is a flow diagram depicting a process to receive a selection of a broadcast tower from a user, according to various embodiments described herein.

FIG. 5 is a flow diagram depicting a process to receive a selection of a broadcast tower from a user, according to various embodiments described herein. At act 501, the antenna position determination system presents an augmented reality user interface to the user. The augmented reality user interface may include a depiction of the user's environment or surroundings. The depiction of the user's environment or surroundings may be obtained by using a live video feed, such as through a camera coupled to the antenna position determination system.

At act 503, the antenna position determination system indicates the location of one or more broadcast towers to the user via the augmented reality user interface. Indicating the location of the broadcast towers may include using the augmented reality user interface to display a virtual representation of a broadcast tower such that it appears that the virtual representation of the broadcast tower is at the real-world location of the actual broadcast tower.

At act 505, the antenna position determination system receives user input selecting a broadcast tower through the augmented reality user interface.

After act 505, the process ends. In some embodiments, the antenna position determination system uses one or more images to perform the process depicted in FIG. 5 instead of a live video feed.

Figure 6:
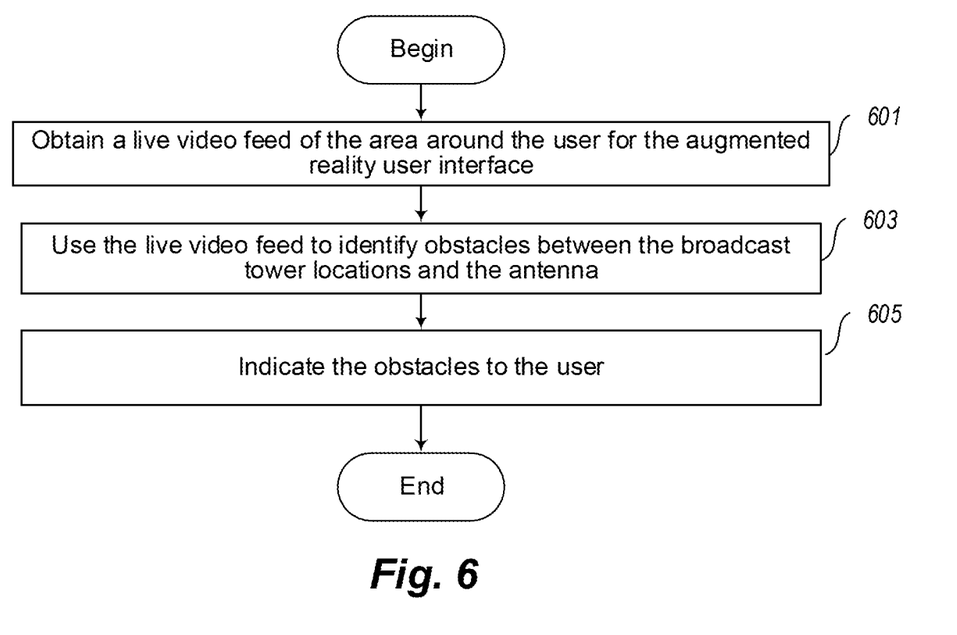
FIG. 6 is a flow diagram depicting a process to identify obstacles between broadcast tower locations and the user, according to various embodiments described herein.

FIG. 6 is a flow diagram depicting a process to identify obstacles between broadcast tower locations and the user, according to various embodiments described herein. At act 601, the antenna position determination system obtains a live video feed of the area around the user for the augmented reality user interface. The live video feed of the area around the user may be obtained from a camera coupled to the antenna position determination system.

At act 603, the antenna position determination system uses object recognition techniques on the live video feed to identify obstacles between the broadcast tower locations and the antenna. The antenna position determination system identifies objects around the user and determines whether the object is between the antenna and a broadcast tower location. The antenna position determination system may determine whether the object is an obstacle based on a determination that the object is between the antenna and the broadcast tower.

At act 605, the antenna position determination system indicates the obstacles to the user. The antenna position determination system may indicate the obstacles to the user via the augmented reality user interface. In some embodiments, the antenna position determination system only indicates the obstacles which are between the antenna and the selected broadcast tower.

After act 605, the process ends. In some embodiments, the antenna position determination system uses one or more images to perform the process depicted in FIG. 6 instead of a live video feed.

Figure 7:
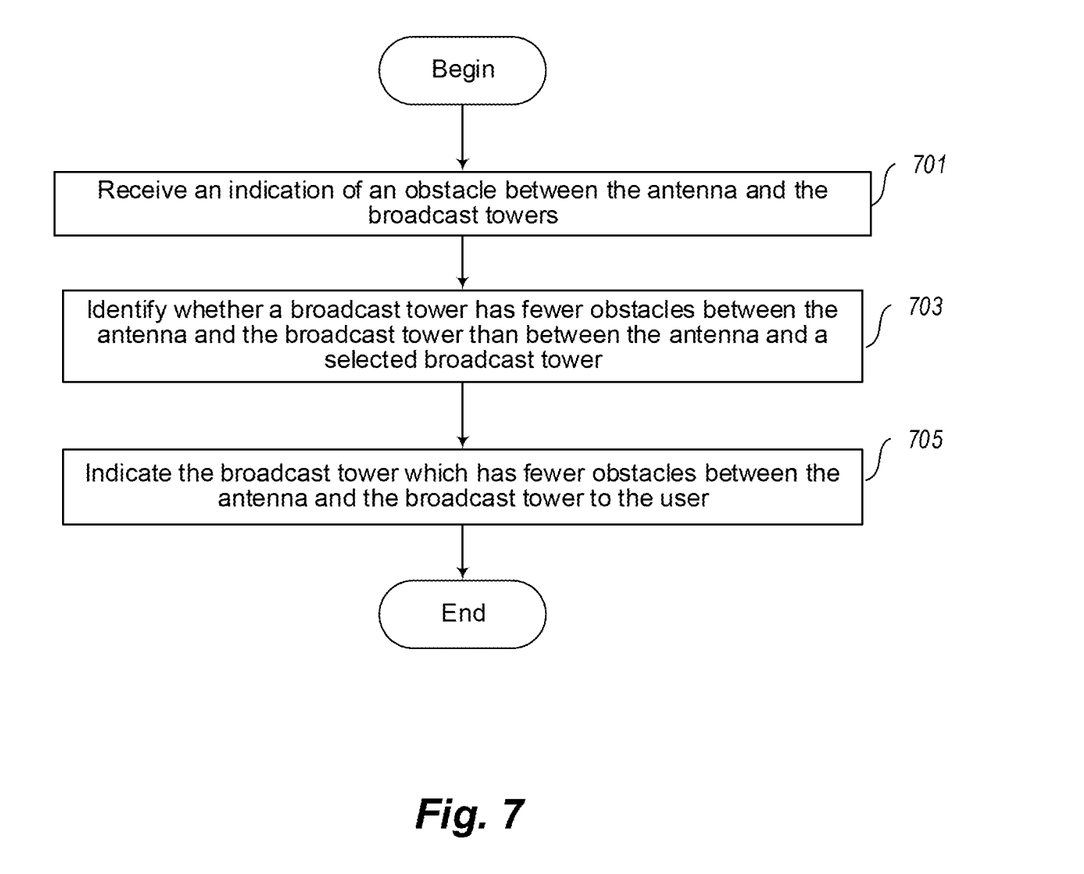
FIG. 7 is a flow diagram depicting a process to determine whether a broadcast tower has fewer obstacles between it and the antenna than the selected broadcast tower, according to various embodiments described herein.

FIG. 7 is a flow diagram depicting a process to determine whether a broadcast tower has fewer obstacles between it and the antenna than the selected broadcast tower, according to various embodiments described herein. At act 701, the antenna position determination system receives an indication of an obstacle between the antenna and the broadcast tower, such as by performing act 605. In some embodiments, the antenna position determination system receives an indication of multiple obstacles between the antenna and the broadcast tower.

At act 703, the antenna position determination system identifies whether a broadcast tower has fewer obstacles between the antenna and the broadcast tower than between the antenna and the selected broadcast tower based on the indication of obstacles between the antenna and the broadcast towers.

At act 705, the antenna position determination system indicates a broadcast tower with fewer obstacles between the antenna and the broadcast tower to the user.

After act 705, the process ends.

Figure 8:
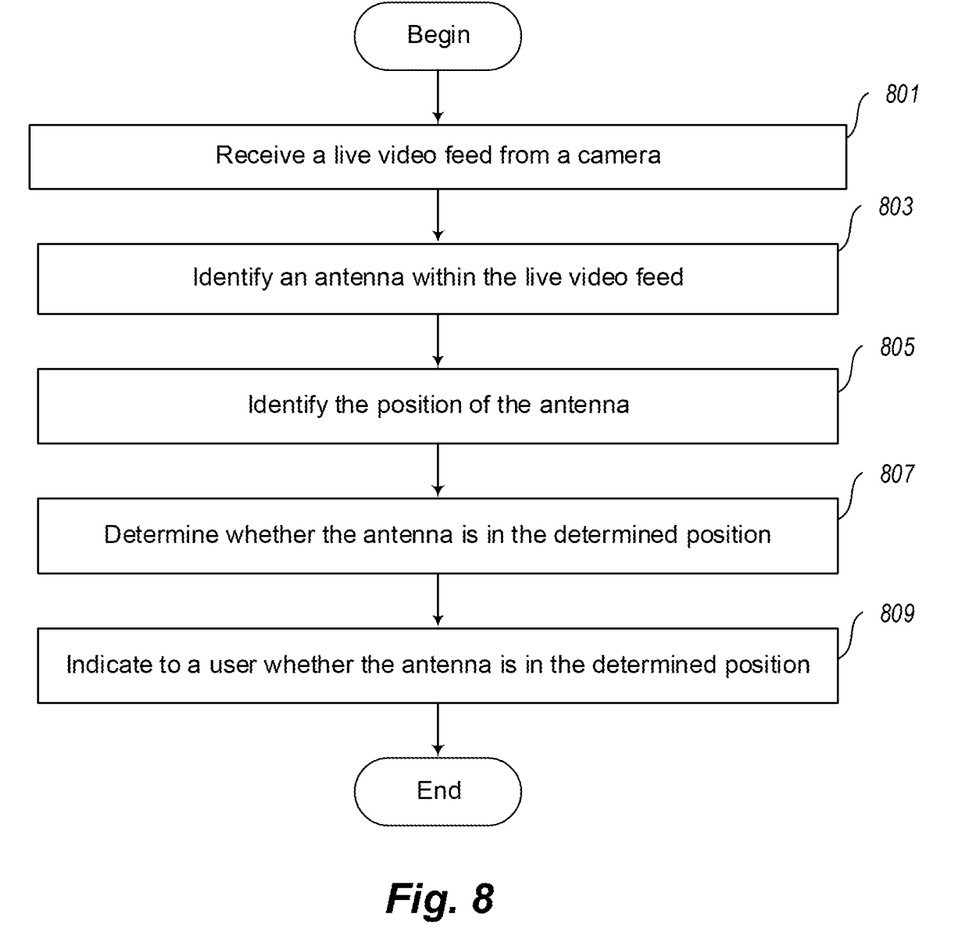
FIG. 8 is a flow diagram depicting a process to determine whether an antenna is in the determined position, according to various embodiments described herein.

FIG. 8 is a flow diagram depicting a process to determine whether an antenna is in the determined position, according to various embodiments described herein. At act 801, the antenna position determination system receives a live video feed from a camera. At act 803, the antenna position determination system identifies an antenna within the live video feed. The antenna position determination system may identify the antenna within the live video feed by using object recognition techniques.

At act 805, the antenna position determination system identifies the position of the antenna. In some embodiments, the position of the antenna may include the orientation of the antenna, location of the antenna, the position of the antenna, the tilt of the antenna, etc. The antenna position determination system may use object recognition techniques to identify the position of the antenna.

At act 807, the antenna position determination system determines whether the antenna is in the determined position. The determined position may be obtained in act 407 of FIG. 4. The antenna position determination system may determine whether the antenna is in the determined position by comparing the identified position of the antenna to the determined position of the antenna.

At act 809, the antenna position determination system indicates to the user whether the antenna is in the determined position.

After act 809, the process ends.

Figure 9:
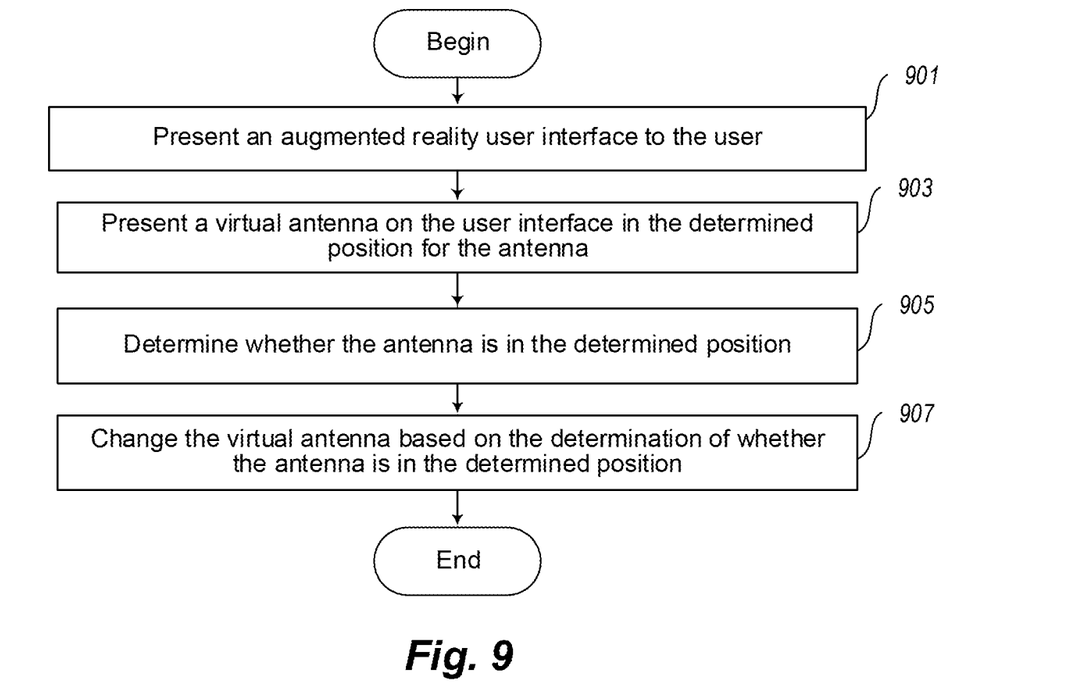
FIG. 9 is a flow diagram depicting a process to use a virtual antenna to indicate to a user that an antenna is in the determined position, according to various embodiments described herein.

FIG. 9 is a flow diagram depicting a process to use a virtual antenna to indicate to a user that an antenna is in the determined position, according to various embodiments described herein. At act 901, the antenna position determination system presents an augmented reality user interface to the user. At act 903, the antenna position determination system presents a virtual antenna on the user interface in the determined position for the antenna.

At act 905, the antenna position determination system determines whether the antenna is in the determined position, such as by performing the process described in FIG. 8. At act 907, the antenna position determination system changes the virtual antenna based on the determination of whether the antenna is in the determined position. In some embodiments, changing the virtual antenna includes changing the color of the virtual antenna.

After act 907, the process ends.

Figure 10:
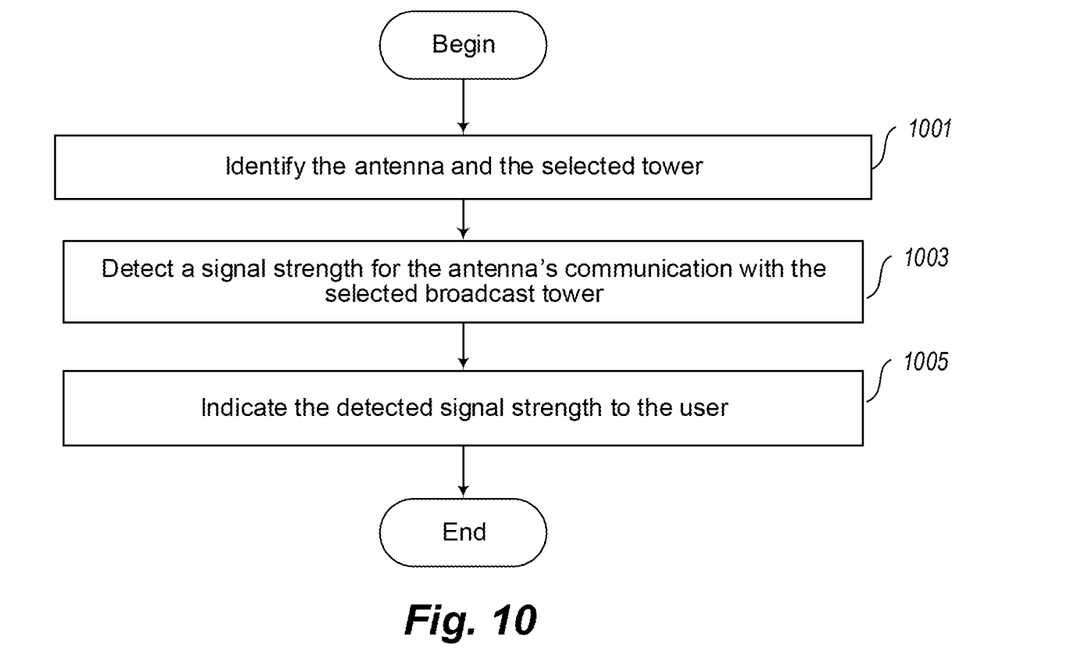
FIG. 10 is a flow diagram depicting a process to detect a signal strength for an antenna's communication with a broadcast tower, according to various embodiments described herein.

FIG. 10 is a flow diagram depicting a process to detect a signal strength for an antenna's communication with a broadcast tower, according to various embodiments described herein. At act 1001, the antenna position determination system identifies the antenna and the selected tower. The antenna position determination system may identify the antenna by communicating with the antenna, scanning a code on the antenna, via object recognition, via user input, etc.

At act 1003, the antenna position determination system detects a signal strength for the antenna's communication with the selected broadcast tower. The antenna position determination system may communicate with the broadcast tower or the network provider to obtain the signal strength for the antenna's communication with the selected broadcast tower. The antenna position determination system may use the identity of the entity to obtain the signal strength for the antenna from the broadcast tower or network provider.

At act 1005, the antenna position determination system indicates the detected signal strength to the user. In some embodiments, the antenna position determination system obtains a signal strength for additional broadcast towers. The antenna position determination system may use the obtained signal strength for the additional broadcast towers to recommend a broadcast tower to the user.

After act 1005 the process ends.

Figure 11:
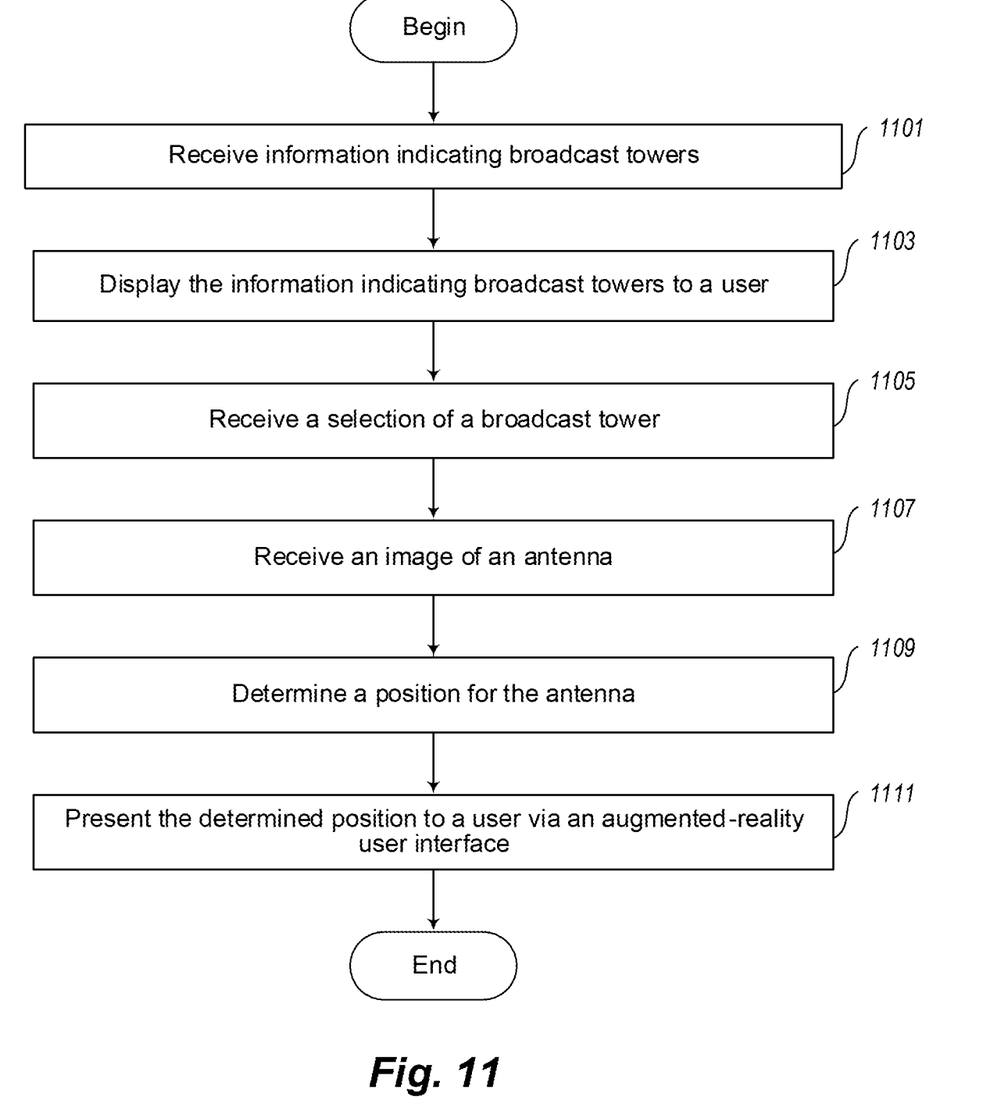
FIG. 11 is a flow diagram depicting a process for a user device to present a determined position for an antenna by using an augmented reality user interface, according to various embodiments described herein.

FIG. 11 is a flow diagram depicting a process for a user device to present a determined position for an antenna by using an augmented reality user interface, according to various embodiments described herein. At act 1101, the user device receives information indicating one or more broadcast towers. At act 1103, the user device displays the information indicating the broadcast towers to the user via an augmented reality user interface.

At act 1105, the user device receives a selection of a broadcast tower. The user device may receive the selection of the broadcast tower via the augmented reality user interface.

At act 1107, the user device receives an image of an antenna. The user device may receive the image of the antenna from a camera coupled to the user device.

At act 1109, the user device determines a position for the antenna. The user device may perform object recognition on the received image to identify the antenna and determine the position for the antenna.

At act 1111, the user device presents the determined position to a user via an augmented reality user interface.

After act 1111, the process ends.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
   at least one processor;
   a camera; and
   at least one memory coupled to the at least one processor, the memory having computer-executable instructions stored thereon that, when executed by the at least one processor, cause the system to:
   electronically receive information indicating one or more broadcast towers, the information indicating one or more broadcast towers including a location for each tower of the one or more broadcast towers;
   electronically select one broadcast tower of the one or more broadcast towers, wherein to select the broadcast tower the system is further caused to:
      electronically present an augmented reality user interface to the user, the augmented reality user interface being configured to:
         electronically indicate the location of the one or more broadcast towers to a user via augmented reality;
         electronically receive a selection of one broadcast tower of the one or more broadcast towers;
      electronically obtain, via the camera, one or more images of the environment around a user;
      electronically perform object recognition on the one or more obtained images to identify objects within the images;
      electronically identify one or more obstacles between the location of the selected broadcast tower and the user based on the location of the selected broadcast tower and the identified objects;
      electronically identify one or more obstacles between the location of the user and one or more broadcast towers other than the selected broadcast tower based on the location of the one or more broadcast towers and the identified objects;
      electronically determine whether a second tower of the one or more broadcast towers has fewer obstacles between the user and the location of the second broadcast tower than the selected broadcast tower; and
      electronically indicate the determination of whether the second tower has fewer obstacles to the user;
   electronically receive an image of an antenna;
   electronically determine, based on the image of the antenna and the selected broadcast tower, a position for the antenna to communicate with the selected broadcast tower; and
   electronically present, via the augmented reality user interface, the position for the antenna to a user.

2. The system of claim 1, wherein the system further comprises a camera and causing the system to electronically receive an image of the antenna includes causing the system to:
   electronically receive the image of the antenna from the camera.

3. The system of claim 2, wherein the computer-executable instructions further cause the system to:
   electronically receive a live video feed of the antenna from the camera;
   electronically present the live video feed of the antenna to the user via the augmented reality user interface;
   electronically determine whether the antenna is in the determined position for the antenna; and
   electronically indicate whether the antenna is in the determined position for the antenna based on the determination of whether the antenna is in the determined position.

4. The system of claim 3, wherein the computer-executable instructions further cause the system to:

electronically present a virtual antenna in the determined position to a user, via the augmented reality user interface.

5. The system of claim 4, wherein causing the system to electronically indicate whether the antenna is in the determined position further comprises causing the antenna to:
electronically change a color of the virtual antenna based on the determination of whether the antenna is in the determined position.

6. The system of claim 4, wherein the system is further caused to:
electronically identify the antenna within the image obtained by the camera by performing object recognition on the image obtained by the camera.

7. The system of claim 6, wherein the system is further caused to:
electronically identify a tilt of the antenna within the image obtained by the camera by performing object recognition on the image obtained by the camera.

8. The system of claim 7, wherein causing the system to electronically determine a position of the antenna further comprises causing the system to electronically determine the position of the antenna based on the image of the antenna, the selected tower, and the identified tilt of the antenna.

9. The system of claim 1, wherein the system is further caused to:
electronically detect a signal strength for the antenna's communication with a broadcast tower of the one or more broadcast towers.

10. A system comprising:
at least one processor; and
at least one memory coupled to the at least one processor, the memory having computer-executable instructions stored thereon that, when executed by the at least one processor, cause the system to:
electronically receive information indicating one or more broadcast towers, the information indicating one or more broadcast towers including a location for each tower of the one or more broadcast towers;
electronically receive a selection of a first broadcast tower of the one or more broadcast towers;
electronically receive an indication of one or more objects, the indication of the one or more objects indicating a location of the one or more objects;
electronically receive an indication of a location of an antenna;
electronically identify one or more obstacles between the location of the one or more broadcast towers and the antenna based on the location of the one or more broadcast towers, the location of the one or more objects, and the location of the antenna;
electronically determine whether a second broadcast tower of the one or more broadcast towers has fewer obstacles between the antenna and the second broadcast tower than between the selected tower and the antenna; and
electronically indicate the determination of whether the second tower has fewer obstacles to a user.

11. A method in an antenna position determination system, the method comprising:
receiving information indicating one or more broadcast towers, the information indicating one or more broadcast towers including a location for each tower of the one or more broadcast towers;
receiving an image of an antenna;
selecting one broadcast tower of the one or more broadcast towers by:
receiving user input selecting a first broadcast tower of the one or more broadcast towers;
receiving an indication of one or more objects, the indication of the one or more objects including a location of each object of the one or more objects;
determining whether a second broadcast tower of the one or more broadcast towers has fewer obstacles between the antenna and the second broadcast tower than between the antenna and the first broadcast tower; and
indicating the determination of whether the second broadcast tower has fewer obstacles to the user;
determining, based on the image of the antenna and the selected tower, a position for the antenna; and
presenting, via an augmented reality user interface, the position for the antenna to a user.

12. The method of claim 11, wherein selecting one broadcast tower of the one or more broadcast towers includes:
presenting the augmented reality user interface to the user, the augmented reality user interface being configured to:
indicate the location of the one or more broadcast towers to a user via augmented reality; and
receive a selection of one broadcast tower of the one or more broadcast towers.

13. The method of claim 11, further comprising:
receiving the image of the antenna from a camera;
receiving a live video feed of the antenna from the camera;
presenting the live video feed of the antenna to the user via the augmented reality user interface;
determining whether the antenna is in the determined position for the antenna; and
indicating whether the antenna is in the determined position for the antenna based on the determination of whether the antenna is in the determined position.

14. The method of claim 13, further comprising:
presenting a virtual antenna in the determined position to a user, via the augmented reality user interface.

15. A method in a user device, the method comprising:
receiving information indicating one or more broadcast towers, the information indicating one or more broadcast towers including a location for each tower of the one or more broadcast towers;
displaying, via a display connected to the user device, the information indicating the one or more broadcast towers to a user;
receiving, via user input, an image of an antenna;
receiving, via user input, a selection of one broadcast tower of the one or more broadcast towers by:
receiving user input selecting a first broadcast tower of the one or more broadcast towers;
receiving an indication of one or more objects, the indication of the one or more objects including a location of each object of the one or more objects;
determining whether a second broadcast tower of the one or more broadcast towers has fewer obstacles between the antenna and the second broadcast tower than between the antenna and the first broadcast tower; and
indicating, via the display, the determination of whether the second broadcast tower has fewer obstacles to the user;
determining, based on the image of the antenna and the selected tower, a position for the antenna; and presenting, via an augmented reality user interface displayed on the display, the position for the antenna to a user.

16. The method of claim 15, wherein displaying the information indicating the one or more broadcast towers includes:
indicating the location of the one or more broadcast towers to a user via the augmented reality user interface.

17. The method of claim 15, further comprising:
receiving, via a camera connected to the user device, a live video feed of the antenna;
presenting the live video feed of the antenna to the user via the augmented reality user interface;
determining whether the antenna is in the determined position; and
indicating whether the antenna is in the determined position based on the determination of whether the antenna is in the determined position.

18. The method of claim 15, further comprising:
presenting, via the augmented reality user interface, a virtual antenna in the determined position to a user.

\* \* \* \* \*